United States Patent
Chen et al.

(10) Patent No.: US 8,190,687 B1
(45) Date of Patent: May 29, 2012

(54) MULTIMEDIA ALERTING AND NOTIFICATION SERVICE FOR MOBILE USERS

(75) Inventors: Yih-Farn Robin Chen, Bridgewater, NJ (US); Rittwik Jana, Pinebrook, NJ (US); Huale Huang, Livingston, NJ (US); Bin Wei, Basking Ridge, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 885 days.

(21) Appl. No.: 11/069,309

(22) Filed: Mar. 1, 2005

(51) Int. Cl.
*G06F 15/16* (2006.01)
(52) U.S. Cl. ........ 709/206; 709/204; 709/205; 709/208; 709/207
(58) Field of Classification Search .......... 709/204–207, 709/208
See application file for complete search history.

(56) References Cited

U.S. PATENT DOCUMENTS

| | | | |
|---|---|---|---|
| 6,397,054 B1 * | 5/2002 | Hoirup et al. | 455/404.1 |
| 6,775,356 B2 * | 8/2004 | Salvucci et al. | 379/49 |
| 7,010,097 B2 * | 3/2006 | Zellner et al. | 379/45 |
| 7,133,420 B2 * | 11/2006 | Chang et al. | 370/496 |
| 7,200,680 B2 * | 4/2007 | Evans et al. | 709/246 |
| 7,277,549 B2 * | 10/2007 | Olkin et al. | 380/277 |
| 2002/0120697 A1 * | 8/2002 | Generous et al. | 709/206 |
| 2005/0064884 A1 * | 3/2005 | Dumont et al. | 455/466 |
| 2005/0076109 A1 * | 4/2005 | Mathew et al. | 709/223 |
| 2005/0220041 A1 * | 10/2005 | Lin | 370/278 |
| 2005/0221866 A1 * | 10/2005 | Huang et al. | 455/567 |
| 2005/0251848 A1 * | 11/2005 | Al-Janabi | 725/135 |
| 2006/0013196 A1 * | 1/2006 | Bodmer et al. | 370/352 |
| 2006/0195506 A1 * | 8/2006 | Deng | 709/203 |
| 2007/0082711 A1 * | 4/2007 | Zhao et al. | 455/566 |
| 2008/0261554 A1 * | 10/2008 | Keller et al. | 455/404.1 |
| 2009/0164665 A1 * | 6/2009 | Foote et al. | 709/245 |

* cited by examiner

*Primary Examiner* — Jeffrey Pwu
*Assistant Examiner* — Abdelnabi Musa

(57) ABSTRACT

In accordance with the teachings of the present invention, an architecture and method is presented for proving multimedia emergency information. A platform is presented that separates content control and delivery control of emergency multimedia information to provide real-time alerting to recipients.

16 Claims, 5 Drawing Sheets

MULTIMEDIA ALERTING AND NOTIFICATION SERVICE FOR MOBILE USERS

BACKGROUND OF THE INVENTION

1. Field of the Invention

The present invention relates to media services with communications devices and specifically mobile devices.

2. Description of the Prior Art

With the increased popularity of mobile devices and wireless access, mobile users who are first respondents to emergency situations are beginning to demand the delivery of multimedia-based alert content to cope with crisis more effectively. For example, when a life-threatening situation occurs in a public place (such as bombing in a subway station), it is very important to engage professionals as soon as possible. Mobile devices may be used to notify the medical professionals, policemen, etc. Personnel at the site can use their mobile devices to upload real-time video of injuries and damages so that they can be seen by doctors, the emergency crew, etc. Given the time critical nature of the situation, they will be able to make an assessment and recommend more adequate solutions before they even arrive at the site.

In addition, as mobile devices become more powerful, the demand for multimedia-based messaging services will increase. However, managing real-time multimedia content for a large number of users is difficult to do with conventional communications systems.

Thus, there is a need for a method and apparatus for providing multimedia capability to meet the demand for multimedia services.

SUMMARY OF THE INVENTION

In accordance with the teachings of the present invention, a service infrastructure is presented including a middleware messaging platform integrated with a multimedia service engine. The messaging platform provides user authentication, authorization, and accounting. The multimedia service engine manages multimedia content including real-time multimedia acquisition and delivery.

In one embodiment, the service infrastructure is implemented with an enterprise messaging network (EMN) that performs user authentication and authorization. The multimedia service engine includes a content management engine and delivery management engine to support real-time multimedia data acquisition, transcoding, and delivery. In addition, an interface referred to as an infolet is provided to enable communications between the EMN and the multimedia service engine.

A multimedia architecture, comprises a messaging network providing profile matching and authentication of an end user attempting to send a multimedia message to a recipient; an alerting platform in communication with the messaging network, the alerting platform providing an alert posting of the multimedia message; and a multimedia platform in communication with the messaging network and the alerting platform delivering the multimedia message to the recipient.

A method of providing an emergency multimedia service, comprises the steps of in a network; receiving a multimedia emergency message for a recipient; and delivering the multimedia emergency message on a priority basis to the recipient in real-time.

A multimedia platform, comprises an input receiving multimedia information, the multimedia information including content and control signaling; a multimedia content manager coupled to the input and performing content management of the multimedia information; and a multimedia delivery manager coupled to the input and managing the control signal of the multimedia information.

DESCRIPTION OF THE INVENTION

Figure 1:
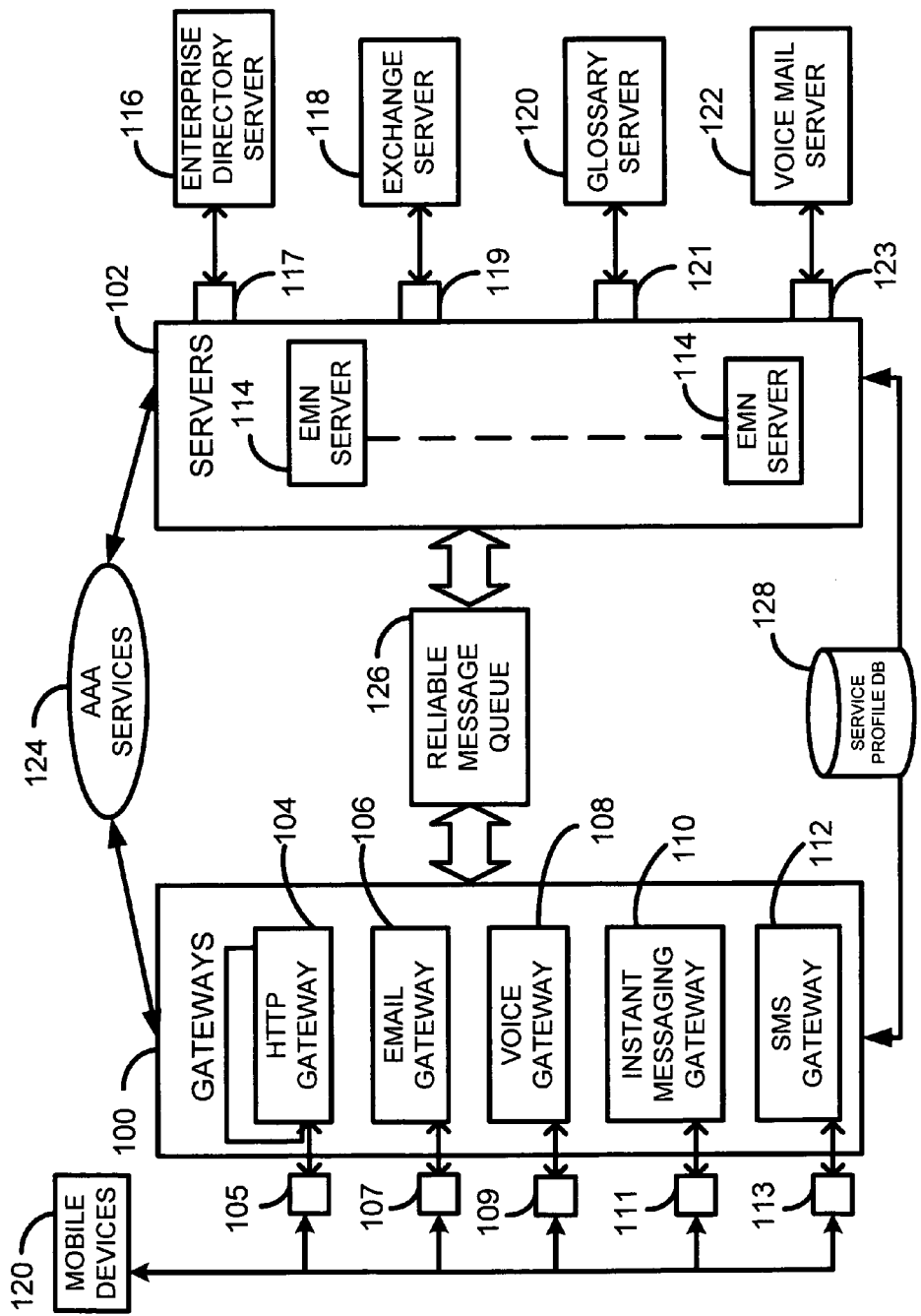
FIG. 1 displays one embodiment of an enterprise messaging network (EMN) implemented in accordance with the teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

In accordance with the teachings of the present invention, a multimedia architecture is presented. In one embodiment, the multimedia architecture includes a messaging network, an alerting platform, and a multimedia platform. In one embodiment, the multimedia architecture provides emergency multimedia services. In another embodiment, the multimedia architecture is implemented to deliver emergency multimedia information, such as multimedia alerts. In accordance with the teachings of the present invention, emergency multimedia information includes multimedia information associated with an emergency situation and/or incident. In one embodiment, the multimedia information is delivered on a priority basis in a network, meaning that network resources are provided to transport the emergency message with a priority. This would occur, for example, in the same way that a 911 call would be given priority in a network during an emergency event.

A multimedia architecture implemented in accordance with the teachings of the present invention performs a variety of functions and includes a variety of features. A subset of those functions includes: 1) user management; 2) access management; 3) device adaptation; 4) content acquisition; 5) quality of service; 6) delivery control, and 7) scalability. As a part of user management, the multimedia architecture determines who receives the content. As part of access management, the multimedia architecture authenticates and authorizes user requests, and allows users access from outside a firewall. As part of device acquisition function, the multimedia architecture reformats multimedia content for mobile users with different mobile devices. As part of content acquisition, the multimedia architecture facilitates the real-time content acquisition from mobile devices at the location of an emergency and then makes the content available to other relevant mobile users. The multimedia architecture provides quality of service by prioritizing urgent request to make sure that urgent requests always get through with a delivery guarantee. The multimedia architecture provides delivery control, such as: a) providing a secure method so that content is only available to those that should receive it; and b) ensuring that the content has been delivered and that a recipient has viewed the content. Lastly, the multimedia system is designed to support a large number of mobile users in a scalable way.

In accordance with the teachings of the present invention, a multimedia architecture including an emergency messaging network, an alerting platform, and a multimedia platform is presented. A messaging network implemented in accordance with the teachings of the present invention includes the technology required to provide an electronic messaging service. In one embodiment, a messaging platform includes the gateways and servers, which separate device-dependent and device-independent message processing requirements.

FIG. 1 displays one embodiment of an emergency messaging network (EMN) implemented in accordance with the teachings of the present invention. In one embodiment, the EMN is implemented as a middleware platform and provides a front-end interface to authenticate mobile users before they can interact with services platforms. The emergency messaging network (EMN) of FIG. 1 includes gateways 100, such as HTTP gateway 104, email gateway 106, voice gateway 108, instant messaging gateway 110, and short messaging service (SMS) gateway 112. In one embodiment, the gateways 100 provide a protocol interface for an end-user device. In another embodiment, the gateways 100 authenticate a mobile user and put each service request on a message queue. The servers 102 include emergency messaging network (EMN) servers 114. It should be appreciated that there may be a wide variation in both the number and type of gateways 100 and/or servers 102.

The gateways 100 and the servers 102 are in communication via a reliable message queue 126. In addition, the gateways 100 and the servers 102 are in communication with services (i.e., hardware/software) that provide authentication, authorization, and accounting services (AAA services) 124 and with a service profile database 128. In one embodiment, the service profile database 128 stores end-user profile information for end users operating mobile devices 120, such as cellular telephones, PDAs, wireless laptops, etc. The end-user profile information includes the services the end user is registered for, such as devices and protocols for each of the users. Further, the service profile database 128 assists in the transcoding and service delivery process.

The mobile devices 120 communicate with the gateways 100 through a protocol interface referred to as a devlet (105, 107, 109, 111, 113) to access services. The devlet (105, 107, 109, 111, 113) provides a protocol interface between the various mobile devices 120 and the various gateways 100. For example, one of the mobile devices 120, such as a PDA, may communicate with the email gateway 106 using devlet 107 that converts the protocol of the PDA to the protocol of the email gateway 106.

The servers 102 communicate with various servers (116, 118, 120, 122) through an interface referred to as an infolet (117, 119, 121, 123), respectively. In one embodiment, the EMN servers 114 process requests from the reliable message queue 126 in a round-robin fashion. The EMN servers 114 serve the message request by invoking corresponding service engines (i.e., enterprise directory server 116, exchange server 118, glossary server 120, and voice mail server 122) through the infolets (117, 119, 121, 123), respectively.

In an emergency operation, an end user operating one of the mobile devices 120, such as a PDA, may take a picture or a video at the scene of an emergency. The PDA communicates with one of the gateways 100 through one of the devlets (105, 107, 109, 111, 113). Authentication, authorization, and accounting services (AAA services) 124 are performed and the end-users service profile is accessed from the service profile database 128. Assuming the end user has a right to access the network and has registered for the appropriate service, an emergency message is placed in the reliable message queue 126. The servers 102 access the emergency message from the reliable message queue 126 and according to the request invoking one of the service engines (i.e., enterprise directory server 116, exchange server 118, glossary server 120, and voice mail server 122) through the infolets (117, 119, 121, 123), respectively.

Figure 2:
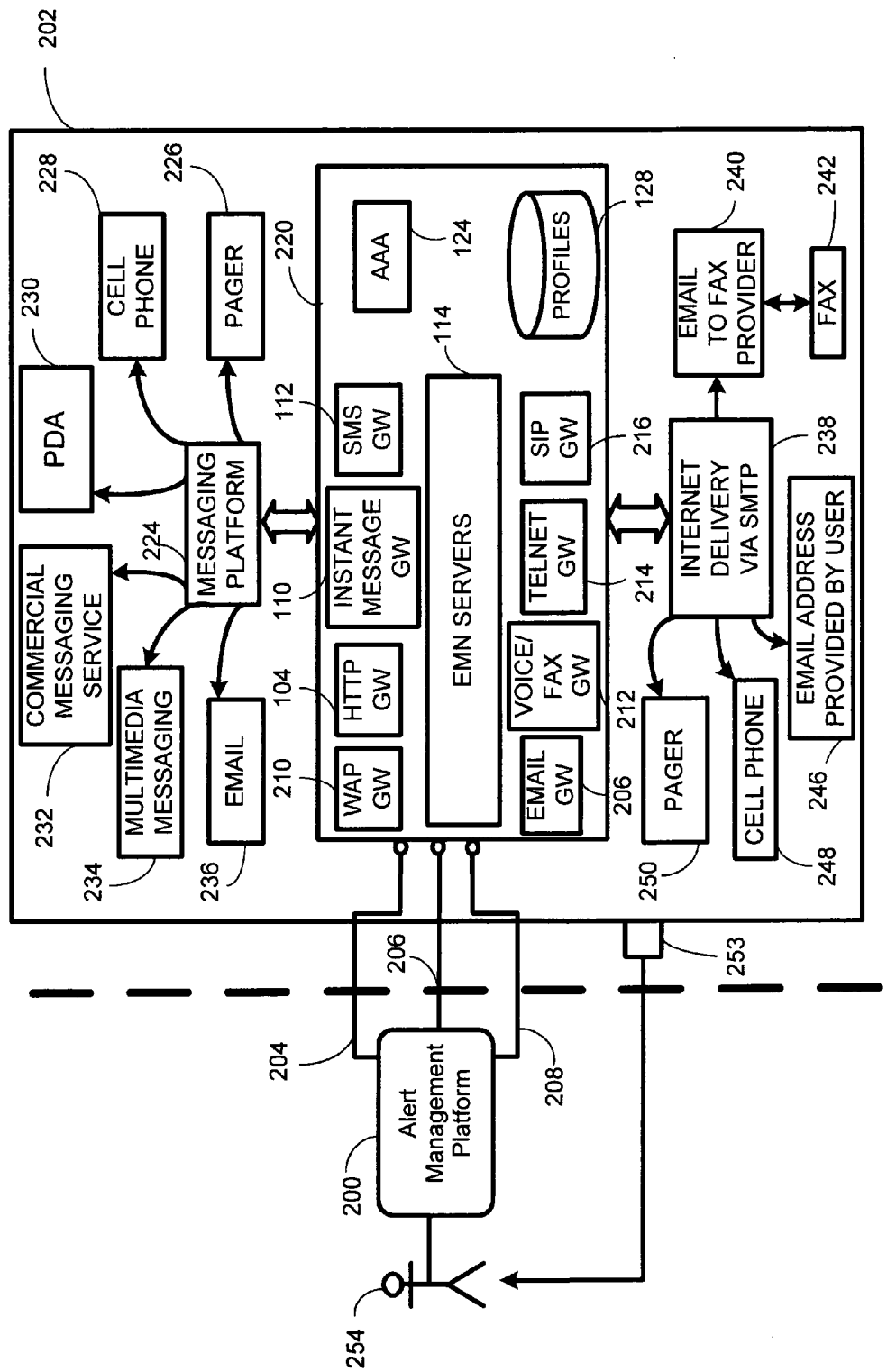
FIG. 2 displays with one embodiment of an emergency messaging platform implemented in accordance with the teachings of the present invention.

FIG. 2 displays an alerting platform (AP). The alerting platform of FIG. 2 includes an alert management platform (AMP) 200 and an alert dissemination engine (ADE) 202. The AP shown in FIG. 2 is shown with one embodiment of an emergency messaging platform 220, such as the emergency messaging platform detailed in FIG. 1. The AMP 200 is responsible for managing the business logic of an alert. In one embodiment, the ADE 202 functionality interfaces with the AMP 200 through three-web service interfaces, namely, user provisioning 204, alert notification 206, and alert reporting 208. In one embodiment, an infolet 253 provides an alert acknowledgement interface to the end user 254.

The ADE 202 includes the emergency messaging platform 220 shown in FIG. 2 which includes gateways, such as WAP gateway 210, HTTP gateway 104, instant message gateway 110, SMS gateway 112, email gateway 206, voice/fax gateway 212, telnet gateway 214, and SIP gateway 216. The gateways (210, 104, 110, 112, 206, 212, 214, 216) communicate with EMN servers 114 using AAA services 124 and service profile database 128. In one embodiment, the emergency messaging platform 220 communicates with a messaging platform 224. The messaging platform 224 may deliver emergency content utilizing a pager 226, a cell phone 228, a PDA 230, a commercial messaging service 232, a multimedia messaging platform 234, or an email platform 236. The emergency messaging platform 220 may also deliver emergency content using Internet delivery via simple mail transmission protocol (SMTP) 238. The Internet delivery via SMTP 238 may communicate with an email to fax provider 240 which may in turn communicate with a fax 242. The Internet delivery via SMTP 238 may also communicate with an email address provided by a user 246, a cellphone 248, and/or a pager 250.

In one embodiment, the end user 254 interacts directly with the AMP 200 to perform provisioning and emergency message management. The user provisioning 204 allows the AMP 200 to add, delete, or edit recipients and their devices. Consequently, relevant user profile information is already available to ADE 202 at the time of the emergency message submission in order to efficiently perform emergency message dissemination. The end user 254 interacts directly with the ADE 202 during the acknowledgement process using infolet 253 as an interface to the ADE 202. During operation, the end user 254 interfacing directly with the AMP 200, through a laptop, etc. may disseminate an emergency message (i.e., video message alert) to recipients using the ADE 202. Alternatively, the end user 254 can initiate a multimedia emergency message from a mobile device and have a content manager and a delivery manager in a multimedia platform participate in the distribution as discussed below.

The third part of the multimedia architecture includes a multimedia platform. The multimedia platform collects and stores multimedia content, performs transcoding when necessary, retrieves content from storage system, and streams the multimedia content to mobile devices in appropriate formats. In one embodiment, the multimedia platform control flow is separated from media flow. As a result, one embodiment of the multimedia platform includes a content manager (i.e., control channel) that manages the control flow and a delivery manager (i.e., data channel) that manages the media flow.

The content manager operates to perform: 1) video storage, 2) video acquisition, 3) video transcoding, 4) content selection, and 5) content addressing. The video storage function includes the management and storage required to collect multimedia content; the video acquisition includes the real-time acquisition of multimedia streams when required; the video transcoding includes the transcoding or translation of video streams for delivery purposes; content selection includes sending multimedia content in the proper format for the target device to the delivery manager for streaming or downloading; and content addressing includes generating access information for mobile users to access multimedia content directly from the delivery manager.

The delivery manager is responsible for transferring multimedia content to mobile devices as requested in real time. It should be appreciated that there can be many delivery servers serving the role of the delivery manager since streaming protocols may vary among different mobile devices. Each server may manage different video formats using a different method and more servers can be added for service scalability.

During operation, the content manager provides an end user with the means to access the multimedia stream and also to transfer the proper stream to the delivery manager, which manages the final media flow. It should be appreciated that not all mobile devices are equipped with streaming capability and hence it is possible that mobile devices will download the video file and play it locally.

Figure 3:
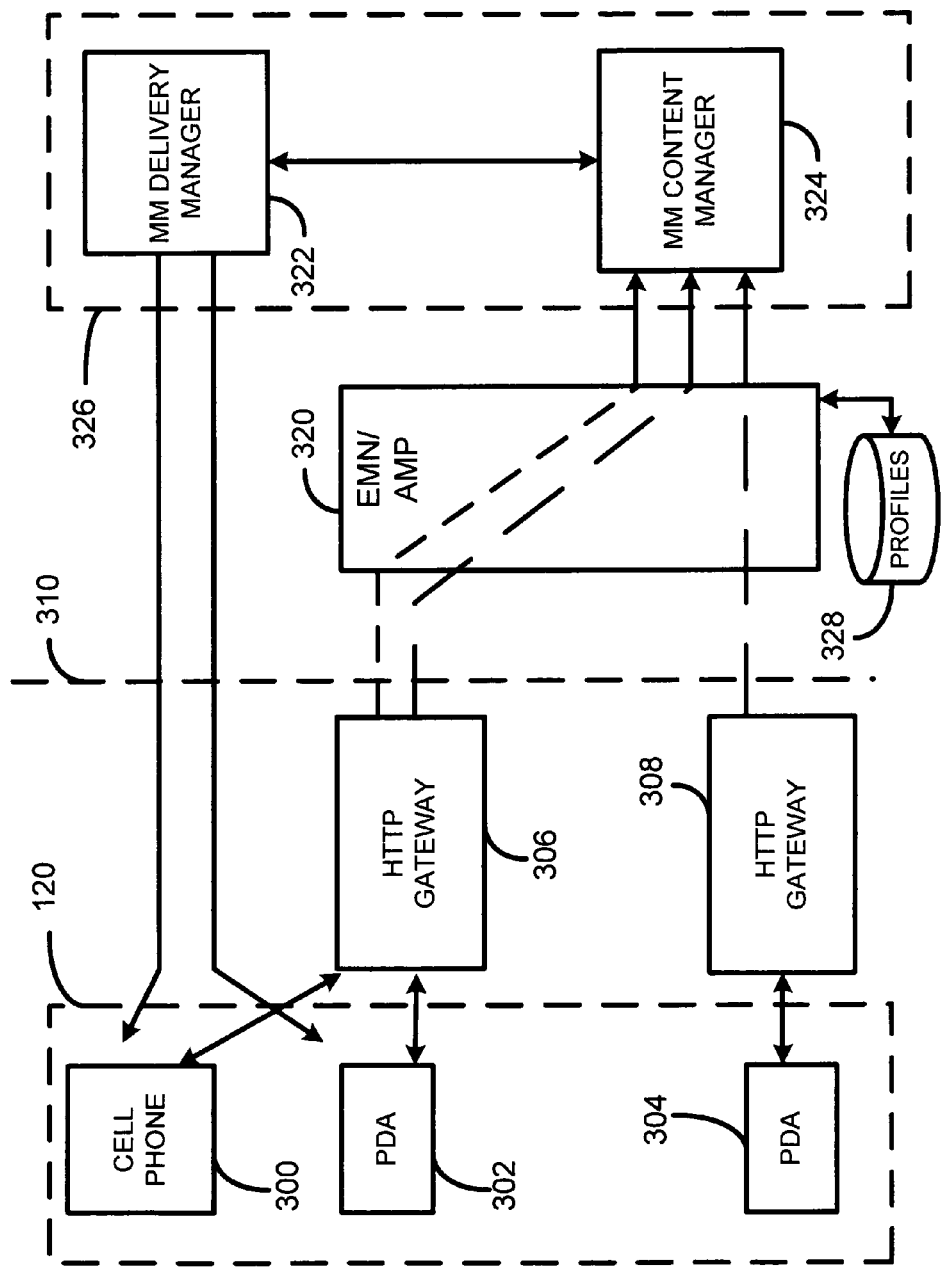
FIG. 3 displays a system architecture for multimedia services implemented in accordance with the teachings of the present invention.

FIG. 3 displays a system architecture for multimedia services implemented in accordance with the teachings of the present invention. Mobile devices 120, such as a cell phone 300, a PDA 302, and a PDA 304 are shown. The PDA 302 and the PDA 304 communicate with HTTP gateways 306 and 308, respectively. The HTTP gateways 306 and 308 is in communication across a firewall 310 with an emergency messaging network (EMN)/alert management platform (AMP) 320. The EMN/AMP 320 also is in communication with a multimedia content manager 324. The multimedia content manager 324 is in communication with a multimedia delivery manager 322. The cell phone 300 is also in communication across the firewall 310 with the multimedia delivery manager 322.

The system architecture for multimedia services shown in FIG. 3 may be integrated to provide a multimedia alerting service. Several methods implement a full end-to-end multimedia alerting service: 1) user and device provisioning; 2) user authentication; 3) real-time video uploading; 4) alert posting; 5) alert notification; and 6) multimedia delivery.

To integrate the multimedia platform 326 with the EMN/AMP 320 and utilize AMP functions, in accordance with the teachings of the present invention, multimedia infolets were implemented on the EMN/AMP 320 servers (i.e., infolets are shown as 117, 119, 121, and 123 of FIG. 1). The infolets act as a bridge between mobile users 120 and the multimedia content manager 324. In accordance with the teachings of the present invention, the infolets provide two basic functions: 1) the infolet allow a mobile user operating a mobile device 120 to upload a multimedia alert and consequently generate the alert to end users via the EMN/AMP 320 and ADE (not shown in FIG. 3, shown as 202 in FIG. 2). The second function is to pass access information to end users operating the mobile devices 120 for them to retrieve video alerts.

When uploading video to the multimedia platform 326, the multimedia content manager 324 either provides an upload page to allow mobile devices 120 to push the media content to the multimedia content manager 324 or communicates to a gateway (306, 308) communicating with the mobile devices 120 to pull the media content. In the first situation, a browser on the mobile devices 120 supports the upload function. In the second situation, a gateway (306, 308) that supports file transfer is running on the mobile devices 120. In either situations, the video is stored and transcoded when needed.

The multimedia content manager 324 also provides users with the interface to post a multimedia alert through EMN/AMP 320 and also keeps the mapping of alert with the media file. Once the content is received and ready for use, it is transported to the multimedia delivery manager 322. On the other hand, EMN/AMP 320 manages the alert posting according to a delivery plan, which contains a set of recipients to be reached. The alert messages, which have text, alert priority, and alerting time, also include the access information on how to access the alert video stream. This access information can be a dynamic URL or software (i.e., a piece of code). The access information is based on what the multimedia content manager 324 provides so that the information obtained through EMN/AMP 320 matches the content available at the multimedia delivery manager 322 for the same alert.

After a multimedia alert is posted, relevant users are notified according to their preferred notification profiles, followed by an acknowledgement process that tracks the outbound notifications. When a mobile user follows the instructions in the notification to view the multimedia content, he needs to authenticate himself through the EMN/AMP 320. Once authenticated, the multimedia content manager 324 responds to the user's multimedia request. The multimedia content manager 324 communicates to EMN/AMP 320 servers and the multimedia delivery manager 322 directly. On the one hand, the multimedia content manager 324 informs the multimedia delivery manager 322 where and how to place the multimedia content for mobile users. On the other hand, the multimedia content manager 324, through the EMN/AMP 320 servers, informs mobile users about the access means for viewing the video content. With this information, mobile users can retrieve or receive the multimedia content directly from the multimedia delivery manager 322. If users are outside a firewall 310, the access information can be encrypted when it is delivered to mobile users. The multimedia delivery manager 322 is also associated with a time-to-live attribute. As a result, when the user session expires, the content is no longer available to users.

As mentioned previously, a multimedia architecture implemented in accordance with the teachings of the present invention performs a variety of functions and includes a variety of features. A subset of those functions include: 1) user management; 2) access management; 3) device adaptation; 4) content acquisition; 5) quality of service; 6) delivery control, and 7) scalability. The various functions will be described with respect to the architecture presented in FIG. 3. In one embodiment, in the EMN/AMP 320, the service profile database 128 of FIG. 1 (not shown in FIG. 3) maintains user and device profiles. Information from the service profile database 128 is used for user management (in conjunction with the EMN/AMP 320) to determine the set of valid or authorized recipients of the multimedia content. The AAA (Authentication, Authorization, and Accounting) services 124 of FIG. 1 (not shown in FIG. 3) in EMN/AMP 320 are used to authorize user requests. The gateways (306, 308) are used for device adaptation. For example, depending on the user's access mechanism through a gateway (306, 308) and the user's profiles in the database (the service profile database 128), the multimedia content manager 324 reformats the content in a proper format, which is suitable for the target mobile devices. For real-time content generation, the multimedia content manager 324 communicates to a mobile device and acquires captured video streams if available in real-time. The video content is then passed to the multimedia delivery manager 322. The multimedia delivery manager 322 then makes the video accessible for the recipients' mobile devices 120. For delivery control, dynamically generated access information is provided to mobile users. For scalability, consideration must be made of both the number of users and the variety of the devices that the system needs to support. As a result, in one method of the present invention, the multimedia architecture may be dynamically adjusted to provide the number of content managers and the delivery servers required to maintain an agreed quality of service.

Figure 4:
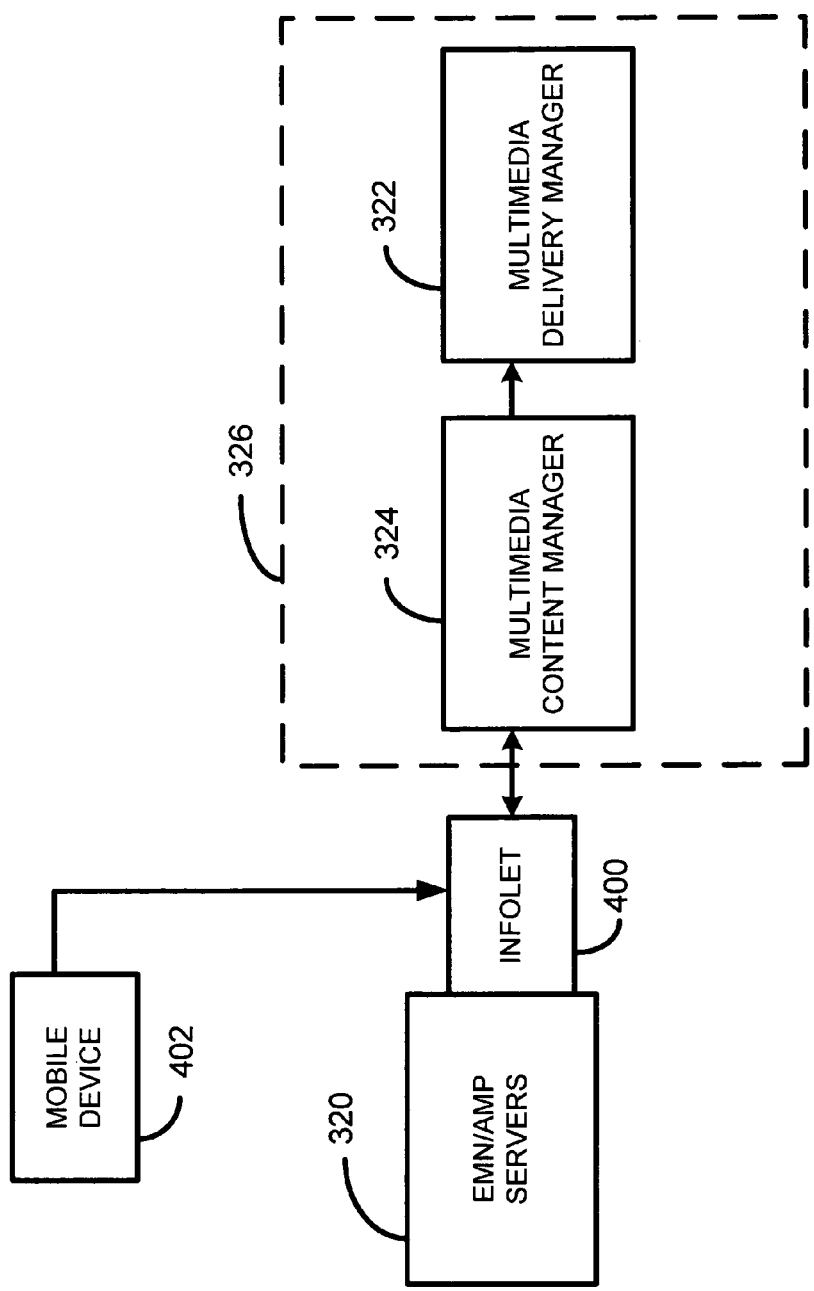
FIG. 4 displays a subset of the multimedia architecture shown in FIG. 3 highlighting the integration of the EMN/AMP server with the infolet and the multimedia platform.

FIG. 4 displays a subset of the multimedia architecture shown in FIG. 3 highlighting the integration of the EMN/AMP 320 servers with the infolet shown as 400 and the communication of the infolet 400 with the multimedia platform 326. The infolet 400 provides a web interface for receiving a multimedia request through the EMN/AMP 320 using the profile database 328. During the processing of the request, the multimedia infolet 400 performs multimedia alert posting.

When uploading is requested, a mobile device 402 communicates through the EMN/AMP 320 servers to the infolet 400 to the multimedia content manager 324. When streaming is requested, the multimedia delivery manager 322 communicates through the multimedia content manager 324, to the infolet 400, to the EMN/AMP 320 servers, and ultimately to a mobile device 402.

In one embodiment of the present invention, during operation, the EMN/AMP server, such as EMN server 114 of FIG. 1, removes messages from an incoming message queue (i.e., such as 126 of FIG. 1) and dispatches the message to a corresponding infolet (such as infolets shown as 117, 119, 121, and 123 of FIG. 1), in this case, to infolet 400 for multimedia request. In one embodiment, the messages include user request for accessing multimedia video. The infolet 400 then uploads a video file from mobile device 402. The address for mobile device 402 is embedded in the message. The infolet 400 sends the video file to the multimedia content manager 324. The infolet 400 informs the multimedia content manager 324 on how to configure the video file for the multimedia delivery manager 322. The infolet 400 then communicates back with the EMN/AMPs 320 to respond to the users' request on how to access the video.

Figure 5:
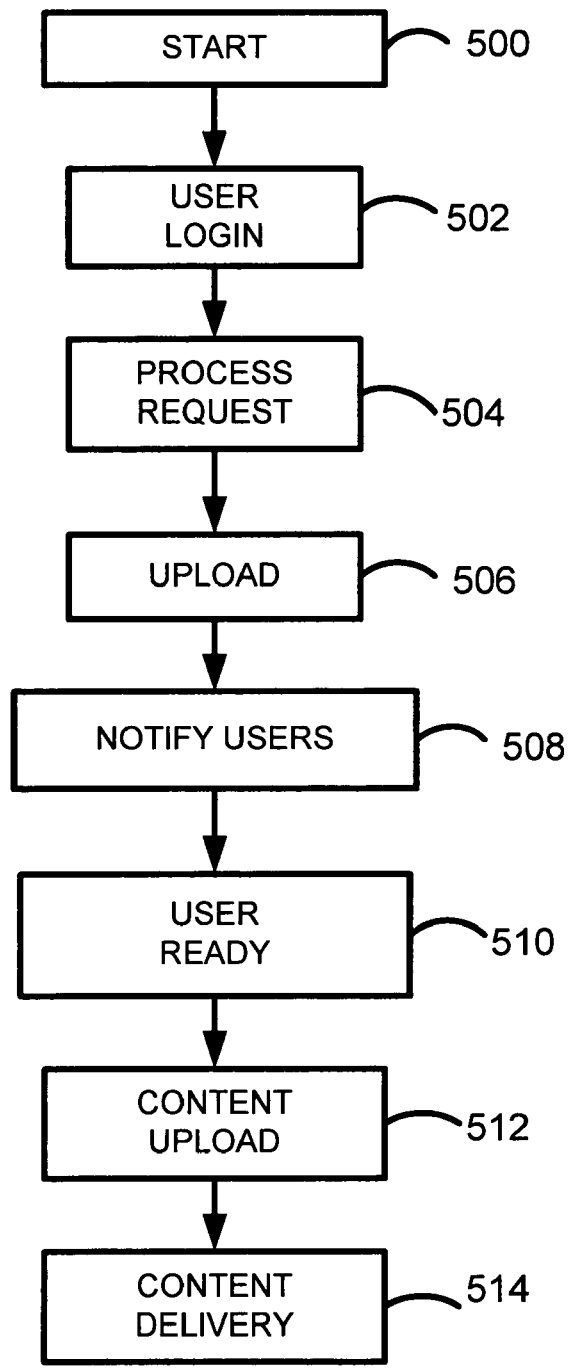
FIG. 5 displays a flow diagram implementing a method of providing a multimedia service.

FIG. 5 displays a flow diagram implementing a method of providing a multimedia service. FIG. 5 will be discussed in conjunction with FIG. 3. Prior to the beginning of the method, the EMN/AMP 320 performs user and device provisioning. At step 500, the method starts, a mobile device 120, such as PDA 304, starts a server and begins to capture video, such as emergency video on the device. At step 502, the user logs in. For example, a communication occurs between the PDA 304 and the HTTP gateway 308 so that the end user may log in through the web interface provided by the HTTP gateway 308. The PDA 304 then requests to post a multimedia alert. At step 504, a process request is made. During a process request, the HTTP gateway 308 communicates with the EMN/AMP 320 to submit a process request. During the process request, the EMN/AMP 320 authenticates the end user and passes the multimedia alert request to the multimedia content manager 324. At step 506, an upload begins. The end user uploads the video from the PDA 304. At step 508, the users are notified. The multimedia content manager 324 acquires the video and alerts the users. At step 510, the users are ready to receive the content or know how to retrieve the multimedia content. The multimedia content manager 324 communicates through the EMN/AMP 320 and through the HTTP gateway 306. The end users operating mobile devices 120, such a PDA 302 receive the alerts and login to obtain access to the information. At step 512, the content is uploaded. The multimedia content manager 324 sends a file to the multimedia delivery manager 322. The multimedia delivery manager 322 provides access information to the users operating the mobile devices 120, such as cell phone 300 and PDA 302. At step 514, content delivery is performed. The mobile devices 120, such as the cell phone 300 and the PDA 302 connect to the multimedia delivery manager 322 for streaming/downloading of video.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is, therefore, intended by the appended claims to cover any and all such applications, modifications, and embodiments within the scope of the present invention.

What is claimed is:

1. A multimedia architecture, comprising:
   a messaging server providing profile matching and authentication of login information of an end user attempting to post an emergency multimedia message;
   an alerting platform in communication with the messaging server, the alerting platform configured to determine a set of relevant recipients for the emergency multimedia message based on a stored delivery plan, and configured to send an alert message to the relevant recipients notifying the relevant recipients that the emergency multimedia message is available and including access information instructing the relevant recipients how to access the emergency multimedia message; and
   a multimedia platform in communication with the messaging server and the alerting platform, configured to receive requests for the emergency multimedia message from a plurality of the recipients in response to the alert message, and configured to deliver the emergency multimedia message to the each of the relevant recipients that request delivery during an active user session, wherein the emergency multimedia message is unavailable for delivery to relevant recipients that request delivery after expiration of the active user session, the multimedia platform comprising:
      a multimedia delivery manager; and
      a multimedia content manager configured to receive configuration information to configure the emergency multimedia message for delivery by the multimedia delivery manager and configured to transmit a multimedia file including the emergency multimedia message to the multimedia delivery manager.

2. A multimedia architecture as set forth in claim 1, wherein the multimedia platform provides separated control and media processing components.

3. A multimedia architecture as set forth in claim 1, wherein the multimedia content manager provides control signaling of alert posting.

4. A multimedia architecture as set forth in claim 1, wherein the multimedia content manager provides media management of alert posting.

5. A method of providing an emergency multimedia service, comprising:

receiving end user login information generated by a mobile device;

receiving a multimedia alert request from the mobile device;

authenticating the end user login information;

passing the multimedia alert request to a content manager;

acquiring a multimedia emergency message from the mobile device;

posting the multimedia emergency message to be accessible to recipients;

determining a set of relevant recipients for the multimedia emergency message based on a stored delivery plan;

notifying the relevant recipients in response to posting the multimedia emergency message;

informing the content manager on how to configure the multimedia emergency message for delivery by a multimedia delivery manager;

transmitting a multimedia file including the multimedia emergency message to the multimedia delivery manager; and delivering the multimedia emergency message to each of the relevant recipients that request delivery during an active user session, wherein the multimedia emergency message is unavailable for delivery to relevant recipients that request delivery after expiration of the active user session.

6. A method of providing an emergency multimedia service as set forth in claim 5, wherein the multimedia emergency message is an emergency video captured by the mobile device at a location of an emergency.

7. A method of providing an emergency multimedia service as set forth in claim 5, wherein delivering the multimedia emergency message to the each of the relevant recipients comprises:

communicating alerts and access information to the relevant recipients;

receiving login information from the relevant recipients; and delivering the multimedia emergency message to the relevant recipients in real-time.

8. A method of providing emergency multimedia service as set forth in claim 5, wherein delivering the multimedia emergency message is performed using separate content processing of the multimedia emergency message and separate control processing of the multimedia emergency message.

9. A method of providing emergency multimedia service as set forth in claim 5, wherein hardware and software resources necessary to deliver the multimedia emergency message on a priority basis to the relevant recipients are provided.

10. A method of providing an emergency multimedia service as set forth in claim 5, wherein acquiring the multimedia emergency message comprises:

receiving a message including an address of the mobile device; and uploading the multimedia file including the multimedia emergency message from the mobile device in response to receiving the message including the address of the mobile device.

11. A computer emergency multimedia service device for providing emergency multimedia service, comprising:

an input of the computer configured to receive multimedia information, the multimedia information including emergency multimedia content and control signaling regarding delivery of the emergency multimedia content;

an alert manager executing on a processor of the computer configured to determine a set of relevant end users to alert regarding the emergency multimedia content based on a stored delivery plan and to notify the relevant end users of the emergency multimedia content;

a multimedia content manager executing on the processor of the computer coupled to the input and configured to:

perform content management of the multimedia information to control storage of the emergency multimedia content and access to the emergency multimedia content;

receive configuration information to configure the emergency multimedia content for delivery; and transmit the emergency multimedia content for delivery; and a multimedia delivery manager executing on the processor of the computer coupled to the input and configured to deliver the emergency multimedia content based on the control signaling of the multimedia information to each of the relevant end users that request delivery during an active user session, wherein the emergency multimedia content is unavailable for delivery to relevant end users that request delivery after expiration of the active user session.

12. A computer emergency multimedia service device as set forth in claim 11, wherein the multimedia content manager generates information on where and how to place multimedia content for access by mobile users.

13. A computer emergency multimedia service device as set forth in claim 12, wherein the multimedia delivery manager provides access information to the mobile users so that the mobile users may acquire multimedia content.

14. A computer emergency multimedia service device as set forth in claim 11, further comprising an infolet wherein the infolet enables a mobile user operating a mobile device to upload a multimedia alert to the multimedia content manager.

15. A computer emergency multimedia service device as set forth in claim 11, further comprising an infolet wherein the infolet enables a mobile user operating a mobile device to generate an alert to the set of relevant end users.

16. A computer emergency multimedia service device as set forth in claim 11, further comprising an infolet wherein the infolet passes access information to the set of relevant end users for the set of relevant end users to retrieve video alerts.

* * * * *